C. E. HITE.
PRIMARY BATTERY.
APPLICATION FILED APR. 15, 1907.
941,366.
Patented Nov. 30, 1909.
3 SHEETS—SHEET 1.
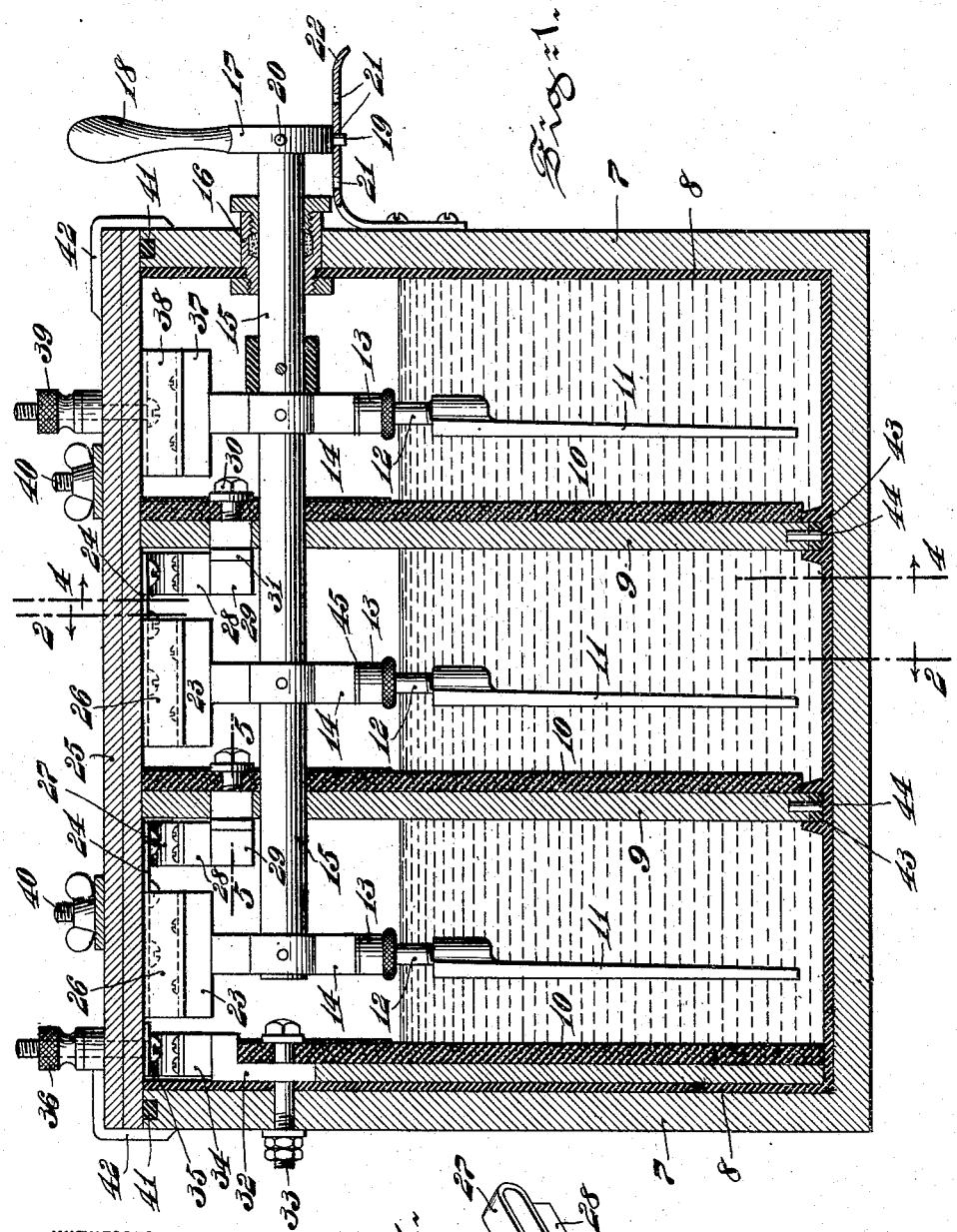
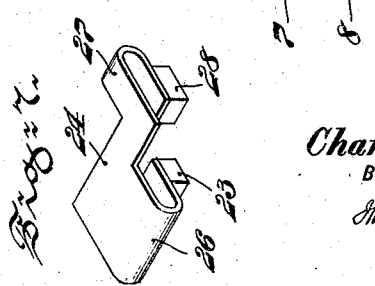
WITNESSES:
Jas. C. Wohnsmith
Mae Hofmann
INVENTOR
Charles E. Hite,
BY
Geo. Crossdale
ATTORNEY.

C. E. HITE.
PRIMARY BATTERY.
APPLICATION FILED APR. 15, 1907.
941,366.
Patented Nov. 30, 1909.
3 SHEETS—SHEET 2.
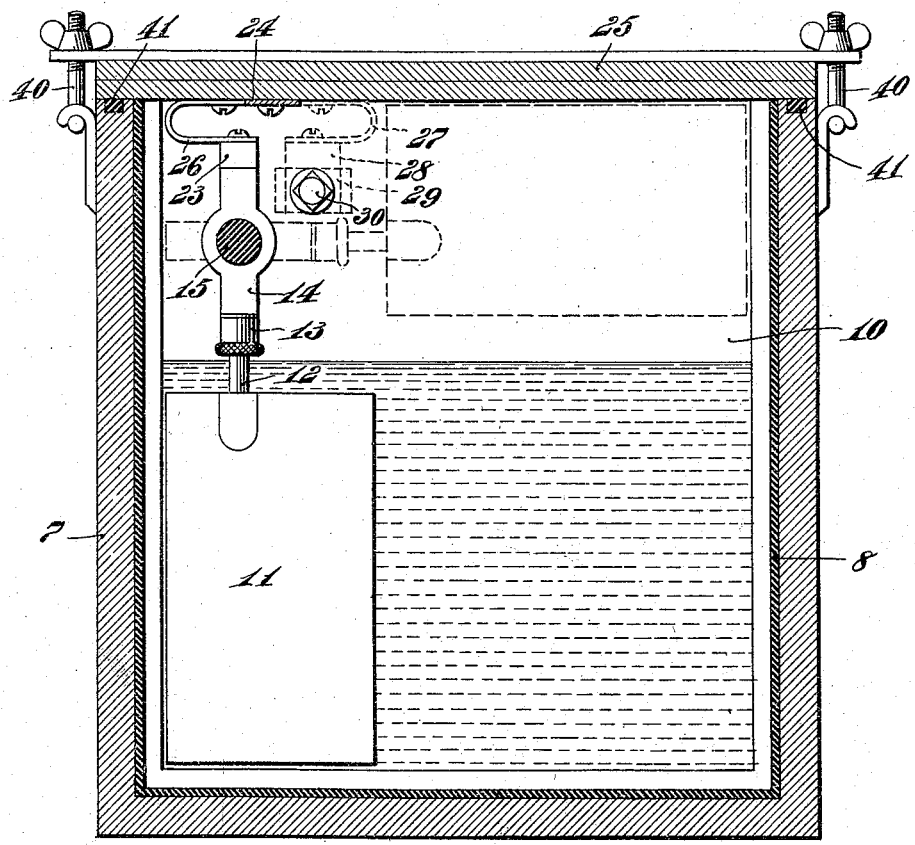
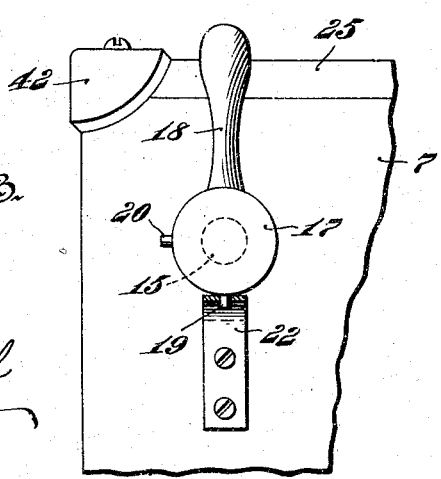
WITNESSES:
Jas. C. Wobensmith
Mae Hofmann
INVENTOR
Charles E. Hite,
BY
Thomas dale
ATTORNEY.

C. E. HITE.
PRIMARY BATTERY.
APPLICATION FILED APR. 15, 1907.
941,366.
Patented Nov. 30, 1909.
3 SHEETS—SHEET 3.
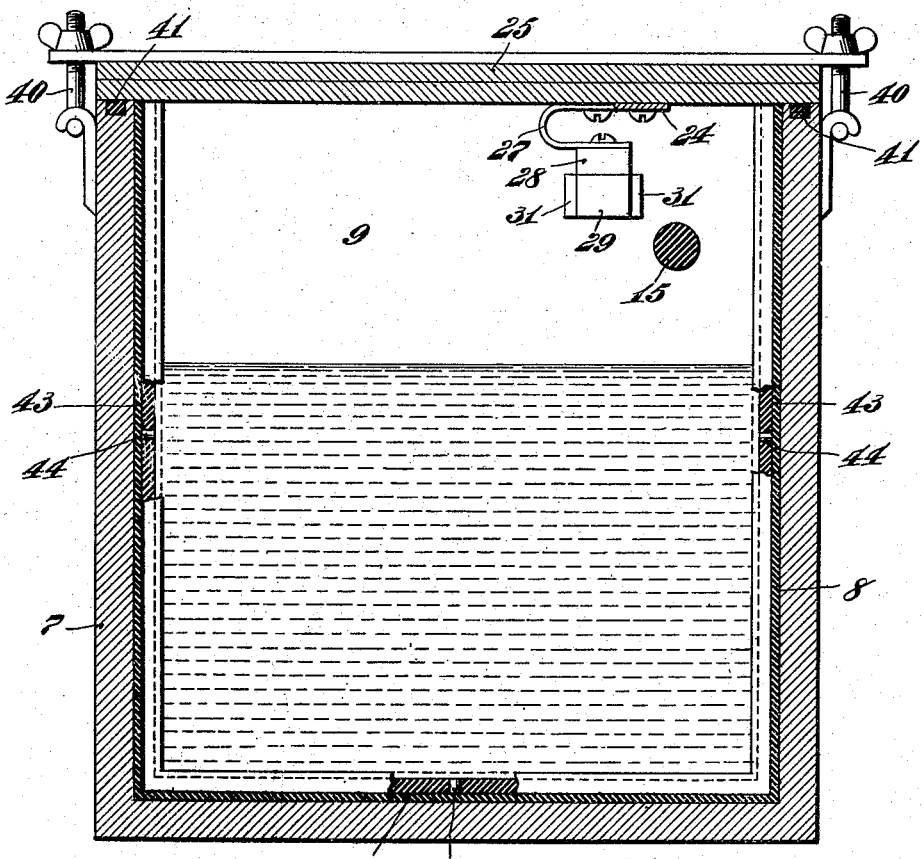
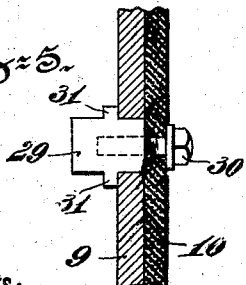
WITNESSES:
Jas. C. Nobresmith
Mae Hofmann
INVENTOR
Charles E. Hite,
BY
Jno. Evasdale
ATTORNEY.

UNITED STATES PATENT OFFICE.

CHARLES E. HITE, OF BURLINGTON, NEW JERSEY.

PRIMARY BATTERY.

941,366.  Specification of Letters Patent.  Patented Nov. 30, 1909.

Application filed April 15, 1907. Serial No. 368,194.

*To all whom it may concern:*

Be it known that I, CHARLES E. HITE, a citizen of the United States, residing at Burlington, in the county of Burlington and State of New Jersey, have invented a new and useful Primary Battery, of which the following is a specification.

My invention relates to improvements in primary batteries.

The object of my invention is to provide a liquid tight battery of sufficient electromotive force for ignition purposes with the make and break or jump spark systems for automobiles and power boats.

My invention also comprises means for the convenient and efficient separation of the soluble electrodes from the electrolyte to prevent deterioration and waste of the elements when the battery is not in use.

My invention also comprises improved means for connecting the couples in series in a convenient, quick and durable manner free from the galvanic action ordinarily produced when metals of a dissimilar nature are in contact in the presence of moisture. Said connections being automatically made by simply placing the cover on the battery.

My invention comprises improved means, by a simple mechanical arrangement, for cleaning the connections in a series of cells in a receptacle.

My invention also comprises improved means for adjusting the distance between the plates or electrodes in the series of cells in order to increase or decrease the electrical output of the battery by thus decreasing or increasing the internal resistance of the battery.

My invention also comprises a cheap and effective combination of plates and partitions in the receptacle whereby the cost of construction is greatly reduced over that of separate cells connected in series.

I accomplish the objects above enumerated by the device illustrated in the accompanying drawings in which—

Figure 1 is a longitudinal vertical section. Fig. 2 is a section on line 2, 2 of Fig. 1. Fig. 3 is an elevation of the handle for rotating the electrode-supporting rod. Fig. 4 is a section on line 4, 4 of Fig. 1. Fig. 5 is a horizontal section on line 5, 5 of Fig. 1. Fig. 6 is a detail showing the disengageable connection between the electrode and the electrode-supporting mechanism. Fig. 7 is a perspective view of the spring and separable contact members.

Similar numerals refer to similar parts throughout the several views.

9 is the paper partition, 10 the carbon electrode, 11 the zinc electrode, 12 the extension above the zinc electrode, 13 the threaded thimble for connecting the electrode-supporting member 14 which is supported on the horizontal rod 15 of hard rubber. On the end of the rod 15 is provided the boss 17 to which is secured the handle 18, and also upon the boss 17 project the two lugs 19 and 20. The rod 15 is journaled in the partitions 9 and also journaled in the threaded bushing 16 in the end of the box 7. The lugs 19 and 20 are adapted to engage in the holes 21 in spring 22 to maintain the rod in any desired position of adjustment either with respect to its rotative movement or its longitudinal movement. The contact supporting members 14 are preferably formed of aluminum, the upper ends of which are adapted to engage with the aluminum blocks 23 which are mounted on the springs 24 secured to the removable top or lid 25 of the box. A spring member 24 is shown in perspective in Fig. 7 and is provided with two spring extensions or terminals 26 and 27. Spring extension 26 carries contact block 23, while spring extension 27 carries a similar contact block 28. The member 14 carries the zinc or positive electrode 77, and is adapted to engage at its upper end with the contact member or terminal 23. Terminal 29 is electrically connected with carbon electrode 10 by the screw 30. This member 29 is provided with the shoulders 31 which engage with the partition 9, and serve to coöperate with the screw 30 to clamp the carbon electrode 10 with the partition 9 to form a physical support for the carbon electrode. The terminal blocks 29 connected with the carbon electrodes are all similar except the one in connection with the carbon electrode which serves as a terminal electrode. This terminal block is marked 32 and is bolted between the side of the box and the carbon electrode 10 by means of the bolt 33. Terminal block 32 is adapted to contact with the terminal block 34 which is electrically connected through the spring 35 with the binding post 36. The electrode 11 which serves as a terminal electrode is connected in a similar way, through its supporting member 14, with the block 37, which is supported on the spring 38, which is in electrical connection with the binding post 39.

It will be understood that the box lid 25 is removable and that the spring supporting contact blocks are carried by the box lid for convenient means of making separable contact with the various electrodes. The box lid is held in position by the bolts 40, the gasket 41 at the upper edge of the box, of yielding material, forming a seal between the lid and the box. The corner pieces 42 secured to the box lid serve to secure a proper seat between the lid and the box. The box lid is lined preferably with a hard rubber lining indicated by 8. In the walls of this lining are provided a series of parallel channels around the three sides of the box, for receiving the partitions 9. These partitions 9 are preferably made of paper or hard fiber suitable to resist the action of the electrolyte, and strong enough to support the electrode 10. These partitions are provided with the pins 44 at the bottom and on the two sides to center the partitions properly in the channel and leave a space all around said partitions in said channel so that when the partition is put in place, pitch or some similar materials may be poured into the channel to form an effective seal between said partitions and the walls of the receptacle. When the various parts are assembled as indicated in the several drawings it will be understood that the electrolyte will substantially cover the electrodes 11, that is, it will stand at a level somewhere near the middle portion of the box. When it is desired to use the battery the electrodes 11 will be in the vertical position as shown in Figs. 1 and 2.

In Fig. 2, the electrode 11 in the vertical position is shown in solid lines. When it is desired to put the battery out of action, however, and to save any waste or consumption of the electrodes or the electrolyte, the rod 15 is turned by operating the handle 18 to carry the soluble electrodes 11 in the position shown in dotted lines in Fig. 2 when the same will be entirely out of the electrolyte. When it is desired to use the battery again, the handle will be turned back to the original position to return the electrodes to the vertical position as shown in Fig. 1. The lugs 19 and 20 on the member 17 are adapted to coöperate with the apertures 21, in the spring 22 to hold rod 15 in either position after it has been rotated. The position of adjustment between the negative and positive electrode is secured by the horizontal movement of the rod 15, that is, to move the electrode 11 nearer to electrode 10 or farther from electrode 10 and the three holes 21 in the spring 22 are adapted to coöperate with the projection 19 to secure said rod in any of several positions of longitudinal movement. The contact blocks 23 are made longer than the width of the member 14 as presented in Fig. 1 so as to permit of this longitudinal adjustment of the electrode-supporting members 14.

It is also to be stated that the contact 23 and the members 14, and the contacts 28 and 29 are all preferably made of aluminum.

The non-active sides of the soluble electrodes, which are preferably tapered toward their lower ends, are coated with a non-conducting insoluble material. It is also preferable to coat the carbon or negative electrode with a similar material from about the level of the electrolyte to the top of the electrode on the surface away from the partition. The arm or extension 12 may be either threaded into the electrode member 11 or cast therewith, or connected therewith in any suitable way. Extension 12 is provided with the head 48, see Fig. 6, which is seated in the thimble 13 which is threaded to the lower end of the supporting member 14. The gasket 45 is inserted between said thimble and lower end of member 14 and to prevent any leak of the electrolyte into the thread of the members 13 and 14. This gasket also serves to prevent the member 13 working loose by the jarring of the battery. I also find it desirable to coat all the metallic surfaces within the battery except the active faces of the electrodes and the contacting surfaces of the contact pieces with asphaltum or celluloid or some other insoluble non-conductive material to prevent corrosion of the metal or any galvanic action where dissimilar metals are in contact.

What I claim is:—

1. In a primary battery, the combination of a receptacle provided with a hard rubber lining, said lining provided with a plurality of parallel channels on three sides of the receptacle, a plurality of partitions loosely seated in said channels, and a sealing material for sealing said partitions in said channels.

2. In a primary battery, the combination of a receptacle divided into a number of compartments by vertical parallel partitions of high electrical resistance, a hard rubber rod passing through said compartments and extending outside of the receptacle through a stuffing box, a plurality of soluble plates constituting electrodes supported by said rod, and means for rotating the rod to move the electrode into and out of the electrolyte as desired.

3. In a primary battery, the combination of a receptacle divided into a number of compartments by vertical parallel partitions of high electrical resistance, a pair of electrodes in each receptacle, a longitudinally movable rod of non-conducting material projecting through said compartments and extending to the exterior of the receptacle, one of each pair of said electrodes supported by said rod, means for moving said rod longitudinally to bring the pairs of electrodes nearer together or farther apart as desired, and means for securing said rod in different positions of adjustment.

4. In a primary battery containing a plurality of positive electrodes tapering toward their lower ends, electrode-supporting members having threaded ends, threaded thimbles for securing the electrodes thereto and flexible gaskets interposed between the thimbles and the electrode-supporting members.

5. A primary battery, comprising a receptacle containing a plurality of electrodes, a removable lid for said receptacle carrying upon its under side springs provided with aluminum terminals for making electrical connection between the several electrodes and between the terminal electrodes and the binding posts.

6. In a primary battery, the combination of a receptacle having its inner surface provided with a plurality of parallel channels, a plurality of partitions seated in said channels, a sealing material for sealing said partitions in said channels, and means for providing spaces in the channels, around the partitions, for receiving the sealing material.

7. In a primary battery, the combination of a receptacle having its inner surface provided with a plurality of channels, a plurality of partitions seated in said channels, a sealing material for sealing said partitions in said channels, and centering pins connected with said partitions as means for providing spaces in the channels, around the partitions, for receiving the sealing material.

CHARLES E. HITE.

Witnesses:
MAE HOFMANN,
HOWARD S. OPIE.